Oct. 16, 1951     E. O. WANGERIN ET AL     2,571,801
MULTIPLE MOTOR DRIVE
Filed Dec. 23, 1948
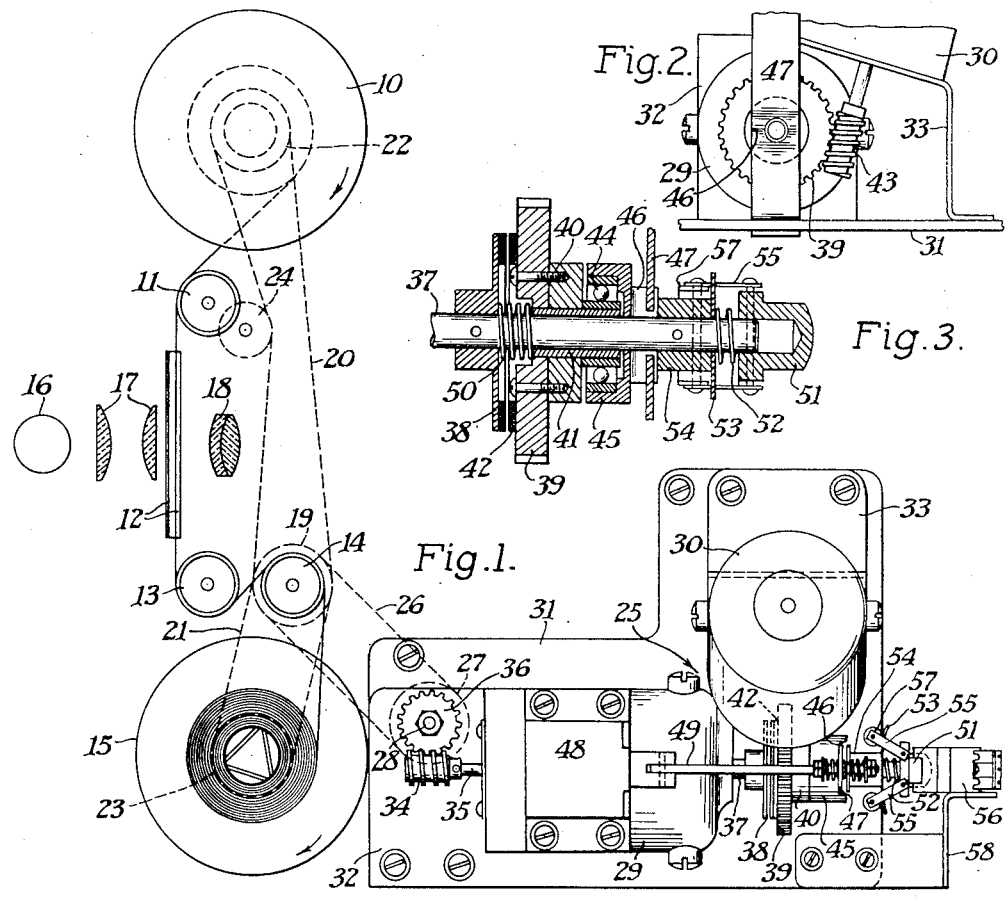
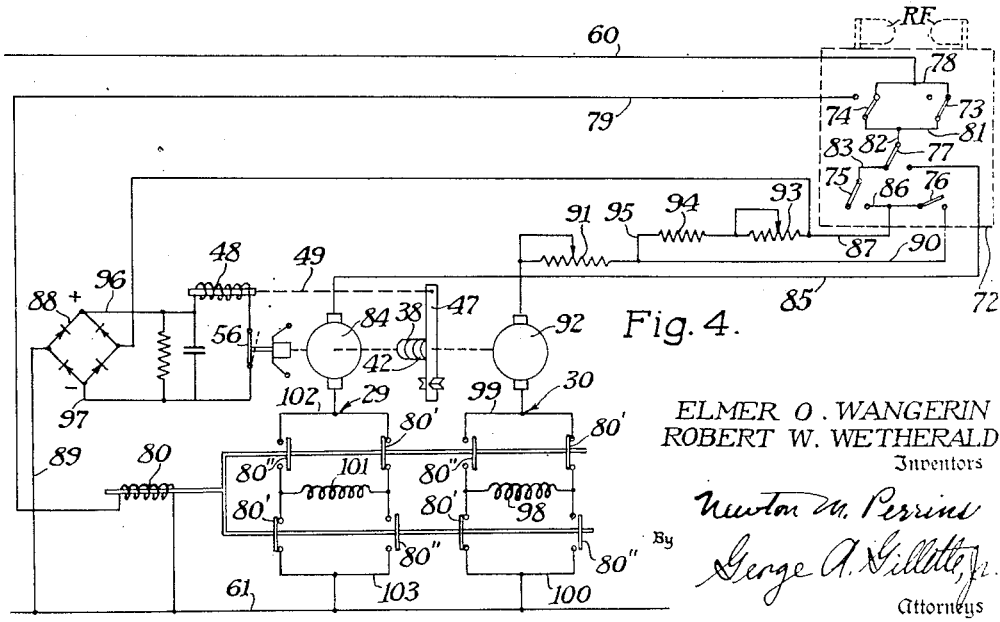
ELMER O. WANGERIN
ROBERT W. WETHERALD
Inventors Patented Oct. 16, 1951

2,571,801

UNITED STATES PATENT OFFICE 2,571,801

MULTIPLE MOTOR DRIVE

Elmer O. Wangerin and Robert W. Wetherald, Rochester, N. Y., assignors to Eastman Kodak Company, Rochester, N. Y., a corporation of New Jersey Application December 23, 1948, Serial No. 67,012

7 Claims. (Cl. 318—91)

This invention relates to a motor drive and more particularly to a multiple motor drive for driving a common drive shaft at a predetermined speed and at any one of several other speeds less than said predetermined speed.

In the winding and reeling of a strip or web of material from a supply source to a take-up source, it is often advantageous to be able to wind at a high rate of speed and also at a low rate of speed for the purpose of inspection, grading, etc. In many instances a single motor with a rheostat control accomplishes the desired result. However, in cases where the strip or web of material even when being moved at a low speed must be arrested instantaneously and in which there must be a very minimum of coasting of the material past a fixed point or station, a rheostat-controlled motor is very impractical.

The embodiment of the present invention is illustrated in connection with the moving of a film strip past a fixed station at any one of several speeds. More particularly the invention is embodied in a film reader in which the desired image on a film strip is projected onto a screen and in which the motor drive is utilized to move the film strip at any one of several speeds for scanning the images projected on a screen and at a much faster rate for moving the section of the film strip to be scanned toward the projecting position. In a film reader, as is well known, the film strip may be moved continuously past the projecting station with the operator scanning the moving images on the screen and is stopped when the desired image to be viewed appears on the screen. The number of images projected on the screen for viewing depends on the magnification of the reader and the size of the document image. It can be readily appreciated that if the document is relatively large only a single image may appear on the screen and it will be necessary for the film drive to be arrested instantaneously in order to prevent the image from coasting off the screen.

In the present invention the film drive for the supply and take-up reels is driven from a common shaft which may be driven by either of two motors. One motor drives the common shaft at a predetermined speed, or high speed, which is used for rapidly moving the film strip from one reel to the other and for bringing the section of film to be scanned into the projecting position. The second motor drives the film strip through a clutch means on the rotor of the first motor at one of two speeds for scanning the projected document images. When the first motor is energized, the second motor is disconnected therefrom, and when the second motor is deenergized it is released from the rotor of the first motor so that no coasting of the drive results. Hence, the film strip does not coast, and the document image to be viewed on the screen is not moved off the screen.

The primary object of the invention, therefore, is to provide a multiple motor drive for a common drive shaft whereby said shaft may be driven at a predetermined speed by one motor and at any one of several speeds by a second motor.

Another object of the invention is to provide a multiple motor drive for a common drive shaft in which one of said motors drives said shaft at a predetermined speed and a second motor drives said shaft through the rotor of said first-mentioned motor at a speed different from the predetermined speed of the first motor.

Yet another object of the invention is to provide a multiple motor drive for a common drive shaft in which one of said motors drives said shaft at a predetermined speed and a second motor when energized is coupled to the rotor of said first-mentioned motor for driving said shaft at a low and an intermediate speed both of which are less than the predetermined speed of said first motor.

Still another object of the invention is to provide a multiple motor drive for a common drive shaft in which a control means successively energizes one motor to drive said shaft through the rotor of the other motor at a low and then an intermediate speed and then energizes a second motor to drive said shaft at a predetermined speed.

And yet another object of the invention is to provide a multiple motor drive for a common shaft in which one of the motors when energized is coupled to the rotor of the other motor and is uncoupled when the other motor is energized.

These and other objects and advantages will be apparent to those skilled in the art by the description which follows:

The above-mentioned and other objects of the invention are embodied in a film strip drive for a film reader in which the drive for both the supply reel and the take-up reel is taken from a common drive shaft and which comprises a first motor operatively connected to said drive shaft and which upon energization is adapted to rotate said shaft at a predetermined speed, a second motor including a plurality of resistances in series circuit with the armature and field winding and adapted upon energization to rotate said shaft at any one of several speeds less than the predetermined speed of said first motor, clutch means for coupling said second motor to the rotor of said first motor, holding means including a solenoid for maintaining said clutch means in an engaged position upon energization of said second motor, a centrifugally operated means on the rotor of said first motor for deenergizing said solenoid upon energization of said first motor, and a control means including a plurality of switches adapted to be successively actuated for energizing said second motor at a low speed and an intermediate speed and said first motor at said predetermined speed. Thus, the present invention is not to be limited by the illustrated embodiment thereof but has a scope as broad as the interpretation of the claims permit.

Reference is now made to the accompanying drawing wherein similar reference characters designate similar elements and wherein:

Fig. 1 is a plan view showing the arrangement of the motor drive and the application of the drive for moving a film strip through a projecting station as in a film reader;

Fig. 2 is a partial end view showing the driving connection between the second motor and the gear member on the rotor of the first motor;

Fig. 3 is a partial vertical section showing the arrangement for mounting the clutch means and the centrifugally-operated switch actuating means on the rotor of the first motor; and Fig. 4 is a wiring diagram of the motor circuits and their application in conjunction with the elements of the film reader shown in Fig. 1.

Although the illustrated embodiment of the invention is disclosed in conjunction with a film reader, it is to be understood that the features of the invention are not necessarily limited to a film reader. It is entirely within the scope of the invention to provide a take-off from the common drive shaft to almost any type of mechanism which is to be driven at several speeds and which must be arrested within very small limits when both motors are deenergized.

As stated above, the illustrated embodiment of the invention is disclosed in conjunction with a conventional film reader in which the film strip is moved from a supply reel 10, over a guide roller 11, through the projecting station as defined by the rotating glass flats 12, around the guide rollers 13 and 14, and then wound up on the core of the take-up reel 15. The images on the film strip, as it is moved between the rotating flats 12, are illuminated by the lamp 16 and the condenser lens system 17, and the projection lens 18 directs the image toward a mirror which, in turn, directs the image onto the rear surface of a screen in a well-known manner.

The reels 10 and 15 are driven in the same direction from suitable sprockets or pulleys 19 on the shaft of the roller 14 and are connected by the chains or belts 20 and 21 to the sprockets or pulleys 22 and 23 on the shafts of the reels 10 and 15, respectively. An adjustable sprocket or pulley 24 may be provided to obtain the proper tension on the belt 20. It will be readily appreciated that the shaft for the roller 14 must be provided with three sprockets, one for driving the reel 10, a second for driving the reel 15 and a third for connecting the film drive to the multiple motor drive, designated broadly by the numeral 25. The third sprocket is connected by the chain 26 to a sprocket 27 on the common drive shaft 28.

The common drive shaft 28 is driven by either of the motors 29 or 30 depending on the speed at which said shaft is to be driven. Both motors are mounted on the common plate 31 by means of the brackets 32 and 33. The first or high speed motor 29 is provided with a worm gear 34 fixed to the extension 35 of its rotor for engaging the worm wheel 36 on the shaft 28. The motor 29, therefore, when energized, drives the shaft 28 at a speed determined by the ratio between the worm 34 and the worm wheel 36 with respect to the rated speed of the motor. Once this ratio between the gears is determined, the speed at which the shaft 28 is driven by the motor 29 becomes the predetermined speed.

The motor 30 is mounted at a right angle to the motor 29 and is inclined at an angle with respect to the horizontal, as shown in Fig. 2. The rotor of the motor 29 is provided with a long extension 37 on the side of the motor opposite the worm 34 and has fixed thereto a clutch member 38. A gear 39 is secured to a ring 40 loosely mounted on the sleeve 41 which is fixed to the extension 37. The gear 39 is provided with a clutch face 42 which is a friction material fixed to said gear and which is adapted to engage a similar material on the clutch member 38. The motor 30 is provided with a worm gear 43 which meshes with the gear 39. The bearing 44 which is mounted on the sleeve 41, see Fig. 3, has its outer race mounted in a ring 45 having a slotted end portion 46 for receiving the arm 47.

The holding means for maintaining the clutch member 38 and the clutch face 42 of the gear 39 in an engaged position comprises a solenoid 48 mounted on the top of the bracket 32 and link 49 connecting the armature of the solenoid with the arm 47. When the second or low and intermediate speed motor 30 is energized, the solenoid 48 is energized and as the armature and link 49 are moved to the left, as viewed in Fig. 1, the arm 47, which is pivotally mounted in the plate 31, moves the ring 45 and the gear 39 axially along the extension 37 so that the face 42 engages the clutch member 38 to drive the shaft 28 through the rotor of the motor 29 at one of several speeds less than the predetermined speed by which the motor 29 drives the shaft 28. The spring 50 normally holds the clutch member 38 and the clutch face 42 of the gear 39 in a disengaged position and when the motor 30 is deenergized it returns said parts to their normal position.

The centrifugally-operated means on the rotor of the motor 29 comprises a switch-actuating member 51 which is maintained in an outward or switch-actuating position by the spring 52, an arcuate plate 53 which is secured to a sleeve 54 fixed to the extension 37, and a plurality of arms 55 which normally hold the actuating member 51 in a predetermined position with respect to the switch 56. The arms 55 are arranged in pairs, one pair being on each side of the extension 37 and connected by the rollers 57 which engage the plate 53. In the position shown in Figs. 1 and 3, the normally open switch 56, which is mounted on the bracket 58 secured to the plate 31, is held in its closed position by the member 51. When the motor 30 is energized the centrifugally-operated means rotates but remains fixed axially and the switch 56 is held closed. However, when the motor 29 is energized and since it rotates the extension at a higher speed than the motor 30, the arms 55 move outwardly to move the member 51 axially toward the plate 53 to allow the switch 56 to open for a purpose to be described hereinafter.

The control means 72 for supervising the energization of said motors comprises a receptacle which houses the forward switch 73, the reverse switch 74, the low speed switch 75, the intermediate speed switch 76 and the high speed switch 77, all of said switches being actuated in a sequence to be described by either the forward speed control arm F or the reverse speed control arm R. The operation of control means 72 for the multiple motor drive will be best understood in connection with the description of the wiring diagram shown in Fig. 4. The switches 73 and 74 are of the double-pole type having a pole of each connected by the line 78 which is connected to the main 60. The other pole of the switch 73 is dead while the other pole of the switch 74 is connected by the line 79 to the reversing relay 80 and the main 61. The contact members of the switches 73 and 74 are connected together by the line 81 which, in turn, is connected by the line 82 to the contact member of the switch 77. The switch 77 is also of the double pole type having one pole connected to the contact member of the switch 75 by the line 83, and the other pole connected to the armature 84 of the motor 29 by the line 85. The switch 75 is of the single pole type and has its pole connected to the contact member of the switch 76 by the line 86, the line 86 being connected by the line 87 to one side of the rectifier 88 which in turn has the other side connected by the line 89 to the main 61. The output side of the rectifier 88 is connected on one side by the line 96 to the solenoid 48 and the pole of the switch 56 and on the other side by the line 97 to the contact member of the switch 56. The switch 76 is also of the single-pole type and has its pole connected by the line 90 and an adjustable resistance 91 to the armature 92 of the motor 30. An adjustable resistance 93 and a fixed resistance 94 are connected in the line 95 connecting lines 89 and 91.

The armature 92 of the motor 30 is connected in series circuit with the field coil 98 by the line 99, and the coil, in turn, is connected to the main 61 by the line 100. In a like manner, the armature 84 of the motor 29 is connected in series circuit with the field coil 101 by the line 102, and the coil, in turn, is connected to the main 61 by the line 103. It will be noted from Fig. 4 that the field coil and aramature circuits each contain four switches. These switches or pairs of contacts are actuated by the reversing relay 80 and are designated as 80′ for those which are normally closed and 80″ for those which are normally open.

Upon depressing the arm F, the switch 73 and the switch 75 are actuated simultaneously, the switch 73 being moved to its dead contact, so that the flow of current is from the main 60 through the line 78, the switch 74, the line 81, the line 82, switch 77 in the position shown in Fig. 4, line 83, switch 75, line 86, line 87, resistances 93, 94, and 91, armature 92, line 99, contacts 80′, field coil 98, contacts 80′, and line 100 to main 61. At the same time, the current flow continues through line 87 to the rectifier 88 and the line 89 to the main 61. Since in this circuit the motor 30 is energized at low speed the switch 56 will be held closed and solenoid 48 will be energized by D. C. current flowing from the rectifier 88 through lines 96 and 97 to move the clutch face 42 axially into engagement with the clutch member 38. It will be noted that when switch 75 is closed, the current flow is through the three resistances so that the current flow to the armature 92 and the coil 98 is at a minimum.

Upon depressing the arm F to its next position, the switch 76 is closed and the switches 73 and 75 are maintained in their actuated position described above. However, instead of the current flow being through the resistances 93 and 94, it is now through the line 90 and only the resistance 91. This second position of the arm F allows more current to flow to the armature 92 and the coil 98 so that the motor rotates at an increased or intermediate speed. Since this speed is not sufficient to cause the arms 55 to move the actuating member 51 axially, the switch 56 remains closed and the solenoid 48 continues to hold the clutch face 42 and the clutch member 38 is in the engaged position. With the arm F in either of these two positions, the motor 29 is not energized and the motor 30, through the worm 43, the gear 39, and the clutch face 42, drives the common shaft 28 through the rotor of the motor 29.

When the arm F is depressed to its third position, the switch 73 remains dead, the switch 77 is actuated to its other pole, and the switches 75 and 76 are opened. With the actuation of switch 77 to its other pole, the current flow is through the line 85 to the armature 84, the line 102, contacts 80′ coil 101, contacts 80′ and line 103 to the main 61. Since the switches 75 and 76 have been opened, the solenoid 48 is deenergized and the spring 50 returns the gear 39 and its clutch face 42 to its normal disengaged position so that the motor 29 drives the common shaft 28 at a high speed entirely disengaged from the motor 30. With the rotor of the motor 29 revolving at high speed, the arms 55 are moved outwardly and the member 51 is moved axially to the left to allow the switch 56 to move to its normally open position. Upon releasing the arm F, the above-described circuits are energized in a reverse order, that is, the switch 77 is moved to its original pole and the switches 75 and 76 are closed to energize the motor 30 at its intermediate speed, and the switch 76 is opened to energize the motor 30 at its low speed. As the arm F is moved from the third to the second position, the clutch member 38 is not engaged until the rotor of the motor 29 decreases in speed to permit the member 51 to again close the switch 56 for energizing the solenoid 48.

Since the rotor of the motor 29 is driven at relatively low speeds in either of the first two positions of the arm F, the releasing of said arm to stop the drive is practically instantaneous due to the releasing of the clutch means. As a result, any coasting on the part of the rotor of the motor 30 is not transmitted to the rotor of the motor 29. By providing a dead contact for the switch 73, a safety measure is introduced which prevents energization of either motor in the event the operator intentionally or inadvertently moves both the arms F and R at the same time. If this should happen, the switch 73 is moved to its dead contact and switch 74 is moved to its contact in the line 79 so that both motor circuits are rendered inoperative.

The control actuating arm R is operated for reversing the direction of rotation of the common drive shaft 28. When the arm R is depressed to any of its three positions, the switch 73 is closed and the switch 74 is moved to its other pole. When the contact member of the switch 74 engages its other pole, the reversing relay 80 is connected to the main 61 by the line 79 for opening the normally-closed contacts 80′ and closing the normally-open contacts 80″ whereby the current flow through the coils 98 and 101 is reversed. In moving the arm R successively through its three positions, the actuation of the switches 75, 76 and 77 takes place in the same sequence as described above, the current flow, however, being through the switch 73.

It can be readily appreciated that the multiple motor drive described above can be adapted to many uses other than as shown for moving a film strip. Further, other modifications of the means, elements, circuits and other devices shown and described herein may be used without departing from the invention. The present disclosure, therefore, is to be construed in an illustrative sense, and the scope of the invention is to be determined by the claims which follow.

Having now particularly described our invention, what we desire to secure by Letters Patent of the United States, and what we claim is:

1. A multiple motor drive for driving a common drive shaft at a plurality of different speeds, the combination comprising a first motor operatively connected to said shaft and upon energization adapted to rotate said shaft at a predetermined speed, a second motor adapted upon energization to rotate said shaft at any one of several speeds less than the predetermined speed of said first motor, clutch means for coupling said second motor to the rotor of said first motor, a holding circuit including a solenoid operatively connected to said clutch means and a normally-open switch means in series circuit therewith and for maintaining said clutch means in an engaged position upon energization of said second motor, and a centrifugally operated means on the rotor of said first motor for holding said switch means in a closed position and for permitting said switch means to move to said normally-open position at a predetermined critical speed of said rotor upon energization of said first motor.

2. A multiple motor drive for driving a common drive shaft at a plurality of different speeds, the combination comprising a first motor operatively connected to said shaft and upon energization adapted to rotate said shaft at a predetermined speed, a second motor adapted upon energization to rotate said shaft at any one of several speeds less than the predetermined speed of said first motor, clutch means adapted to couple said second motor to the rotor of said first motor upon energization of said second motor, a holding circuit including a solenoid operatively connected to said clutch means and a normally-open switch means in series circuit therewith and for maintaining said clutch means in an engaged position upon energization of said second motor, and a centrifugally operated means on the rotor of said first motor and adapted to be actuated at a predetermined critical speed thereof for moving said switch means to a closed position upon deenergization of said first motor and energization of said second motor when said rotor attains said critical speed.

3. A multiple motor drive for driving a common drive shaft at a plurality of different speeds, the combination comprising a first motor operatively connected to said shaft and upon energization adapted to rotate said shaft at a predetermined speed, a second motor adapted upon energization to rotate said shaft at any one of several speeds less than the predetermined speed of said first motor, clutch means adapted to couple said second motor to the rotor of said first motor upon energization of said second motor and to release said second motor from the rotor of said first motor upon energization of said first motor, a holding circuit including a solenoid operatively connected to said clutch means and a normally-open switch means in series circuit therewith and for maintaining said clutch means in an engaged position upon energization of said second motor, and a centrifugally operated means on the rotor of said first motor and adapted to be actuated at a predetermined critical speed thereof for permitting said switch means to move to said normally-open position upon energization of said first motor and for moving said switch means to a closed position upon deenergization of said first motor and energization of said second motor when said rotor attains said critical speed.

4. A multiple motor drive for driving a common drive shaft at a plurality of different speeds, the combination comprising a first motor operatively connected to said shaft and upon energization adapted to rotate said shaft at a predetermined speed, a second motor including a plurality of resistances in series circuit with the armature and field windings and adapted upon energization to rotate said shaft at any one of several speeds less than the predetermined speed of said first motor, clutch means for coupling said second motor to the rotor of said first motor, a holding circuit including a solenoid operatively connected to said clutch means and a normally-open switch means in series circuit therewith and for maintaining said clutch means in the engaged position upon the energization of said second motor, a centrifugally operated means on the rotor of said first motor for permitting said switch means to move to said normally-open position upon energization of said first motor, and a control means for engaging said second motor and for selectively energizing said second motor and said first motor.

5. A multiple motor drive for driving a common drive shaft at a plurality of different speeds, the combination comprising a first motor operatively connected to said shaft and upon energization adapted to rotate said shaft at a predetermined speed, a second motor including a plurality of resistances and a single resistance in series circuit with the armature and field windings and adapted upon energization to rotate said shaft successively at a low speed and an intermediate speed, both of said speeds being less than the predetermined speed of said first motor, clutch means for coupling said second motor to the rotor of said first motor, a holding circuit including a solenoid operatively connected to said clutch means and a normally-open switch means in series circuit therewith and for maintaining said clutch means in an engaged position upon energization of said second motor, a centrifugally operated means on the rotor of said first motor for permitting said switch means to move to said normally-open position at a predetermined critical speed of said rotor upon energization of said first motor, and a control means including a plurality of switches adapted to be successively actuated for energizing said second motor at the low speed and the intermediate speed and said first motor at said predetermined speed, and to be selectively actuated for energizing said second motor and said first motor, one of said switches being adapted to be selectively actuated for reversing the direction of rotation of said motor.

6. A multiple motor drive for driving a common drive shaft at a plurality of different speeds, the combination comprising a first motor operatively connected to said shaft and upon energization adapted to rotate said shaft at a predetermined speed, a second motor including a plurality of resistances and a single resistance in series circuit with the armature and field windings and adapted upon energization to rotate said shaft successively at a low speed and an intermediate speed, both of said speeds being less than the predetermined speed of said first motor, clutch means for coupling said second motor to the rotor of said first motor, a holding circuit including a solenoid operatively connected to said clutch means and a normally-open switch means in series circuit therewith and for maintaining said clutch means in an engaged position upon energization of said second motor, a centrifugally operated means on the rotor of said first motor for permitting said switch means to move to said normally-open position at a predetermined critical speed of said rotor upon energization of said first motor, and a control means including a switch in series circuit with said resistances, a second switch in series circuit with said single resistance, a double pole switch having one pole in series circuit with said first and second switch and the other pole in series with the armature of said first motor and adapted to be successively actuated for energizing said second motor at the low speed and the intermediate speed and said first motor at said predetermined speed and to be selectively actuated for energizing said second motor and said first motor, and a switch in series circuit with said double pole switch adapted to be selectively actuated for reversing the direction of rotation of said motors.

7. A multiple motor drive for driving a common drive shaft at a plurality of different speeds, the combination comprising a first motor operatively connected to said shaft and upon energization adapted to rotate said shaft at a predetermined speed, a clutch member on the rotor of said motor, a gear member including a clutch face slidably mounted on said rotor, a second motor operatively connected to said gear member and including a plurality of resistances and a single resistance in series circuit with the armature and field windings and adapted upon energization to rotate said shaft successively at a low and intermediate speed, both of said speeds being less than the predetermined speed of said first motor, a holding circuit including a solenoid operatively connected to said gear member and adapted to be energized upon energization of said second motor for moving and holding said clutch face in an engaged position with said clutch member and a normally open switch means in series circuit with said solenoid, a centrifugally operated means on the rotor of said first motor for permitting said switch means to move to said normally open position at a predetermined critical speed of said rotor upon energization of said first motor, and a control means including a switch in series circuit with said resistances, a second switch in series circuit with said single resistance, a double pole switch having one pole in series circuit with said first and second switch and the other pole in series circuit with the armature of said first motor and adapted to be successively actuated for energizing said second motor at the low speed and the intermediate speed and said first motor at said predetermined speed and to be selectively actuated for energizing said second motor and said first motor, and a switch in series circuit with said double pole switch adapted to be selectively actuated for reversing the direction of rotation of said motors.

ELMER O. WANGERIN.
ROBERT W. WETHERALD.

REFERENCES CITED

The following references are of record in the file of this patent:

UNITED STATES PATENTS

| Number | Name | Date |
|---|---|---|
| 786,421 | Cutler | Apr. 4, 1905 |
| 854,721 | Day | May 28, 1907 |
| 873,064 | Merrill | Dec. 10, 1907 |
| 2,103,790 | Nason | Dec. 28, 1937 |
| 2,184,344 | Hemphill | Dec. 26, 1939 |
| 2,444,799 | Wood et al. | July 6, 1948 |
| 2,459,829 | Maxwell | Jan. 25, 1949 |